US008769613B2

(12) United States Patent
Latchem et al.

(10) Patent No.: US 8,769,613 B2
(45) Date of Patent: Jul. 1, 2014

(54) DATA SECURITY IN A CLOUD COMPUTING ENVIRONMENT (75) Inventors: Stephen Latchem, Bristol (GB); Bilash Dash, Yorkshire (GB)

(73) Assignee: Mastek (UK) Ltd., Reading (GB)

( * ) Notice: Subject to any disclaimer, the term of this patent is extended or adjusted under 35 U.S.C. 154(b) by 456 days.

(21) Appl. No.: 12/948,646

(22) Filed: Nov. 17, 2010

(65) Prior Publication Data

US 2012/0066769 A1  Mar. 15, 2012

(30) Foreign Application Priority Data

Sep. 14, 2010  (GB) .................................. 1015283.3

(51) Int. Cl.
*H04L 29/06* (2006.01)
*G06F 21/10* (2013.01)

(52) U.S. Cl.
CPC ..................................... *G06F 21/10* (2013.01)
USPC ................................................ 726/3; 726/27

(58) Field of Classification Search
CPC ...................................................... G06F 21/10
See application file for complete search history.

(56) References Cited

U.S. PATENT DOCUMENTS

| | | | |
|---|---|---|---|
| 6,910,133 B1 | 6/2005 | Cohn | |
| 7,509,687 B2 | 3/2009 | Ofek et al. | |
| 7,895,643 B2 | 2/2011 | Yung | |
| 8,112,471 B2 * | 2/2012 | Wei et al. | 709/202 |
| 8,347,398 B1 * | 1/2013 | Weber | 726/26 |
| 2002/0143934 A1 | 10/2002 | Barker et al. | |
| 2004/0221172 A1 | 11/2004 | Stamos et al. | |
| 2006/0129674 A1 | 6/2006 | Minegishi | |
| 2007/0283194 A1 | 12/2007 | Villella et al. | |
| 2008/0005264 A1 | 1/2008 | Brunell et al. | |
| 2009/0132575 A1 | 5/2009 | Kroeschel et al. | |
| 2009/0178144 A1 | 7/2009 | Redlich et al. | |
| 2011/0004939 A1 * | 1/2011 | Cohen et al. | 726/26 |
| 2011/0209193 A1 | 8/2011 | Kennedy | |

FOREIGN PATENT DOCUMENTS

| | | |
|---|---|---|
| EP | 2124166 A1 | 11/2009 |
| EP | 2124166 A1 | 11/2009 |

OTHER PUBLICATIONS

Mastek Limited, "Data Obfuscation in Healthcare—An Approach to Data Privacy," Whitepaper, 2009, 8 pages.
International Search Report and Written Opinion for International Application No. PCT/GB2011/051702, mailed Dec. 27, 2011, 15 pages.
Miranda Mowbray et al. "Enhancing privacy in cloud computing via policy-based obfuscation," The Journal of Supercomputing, ISSN: 0920-8542, DOI: 10.1007/s11227-010-0425-z, Mar. 31, 2010, 25 pages.

(Continued)

*Primary Examiner* — Pramila Parthasarathy (57) ABSTRACT

Methods and apparatus for providing data security, in particular for cloud computing environments, are described. In an embodiment, a software component monitors events at a node in a computing system and on detection of an event of a particular type, interrupts a message associated with the event. Before the message is allowed to continue towards its intended destination, a security template is selected based on the message (e.g. the data in the message and identifiers within the message) and this template is used to determine what data protection methods are applied to each data element in the message. A modified data packet is created by applying the security template and then this modified data packet is inserted into the message in place of the data packet in the interrupted message.

19 Claims, 7 Drawing Sheets

(56) References Cited

OTHER PUBLICATIONS

IP.com Journal, ip.com Inc., West Henrietta, NY, US "Method to Use a Multiple Encryption Mechanism While Dispersing Data for Storage," ISSN: 1533-001, Apr. 29, 2010, 4 pages.

"Data Privacy Protection—Kameleon," Sep. 2010, Mastek Limited, 2 pages.

"Data Obfuscation in Healthcare, An Approach to Data Privacy," 2009, Mastek Limited, 8 pages.

* cited by examiner

DATA SECURITY IN A CLOUD COMPUTING ENVIRONMENT

CROSS-REFERENCE TO RELATED PATENT APPLICATION

This application claims priority to and the benefit of Great Britain Application No. GB 1015283.3, entitled "DATA SECURITY IN A CLOUD COMPUTING ENVIRONMENT" filed Sep. 14, 2010, which is incorporated herein by reference in its entirety.

BACKGROUND

Traditionally, enterprises have maintained the security of their data by keeping the data within a firewall. The advent of cloud computing, however, offers two main benefits to the consumer: sharing of infrastructure (computer storage and processing services) and sharing of applications (software services) to reduce capital expenditure and total cost of ownership. With cloud computing, software, platforms, and infrastructure can be provided as services to enterprises or individual users. The benefits of cloud computing solutions, however, come with increased risks in relation to data security because potentially sensitive data is stored and processed on servers owned by third parties and is likely to be passed between servers within the cloud.

There are many known methods which can be used to obfuscate data (which may also be referred to as 'data masking') to protect the sensitive parts, e.g. identifiable patient data in a healthcare application or personal financial data in a banking application, and these methods include encryption of the data (e.g. using a data transformation algorithm such as AES128) and surrogation of the data (e.g. by systematically replacing certain text with alternative values). In an example of a data security system, data that needs to be accessed by a third party may be copied from a database storing the original data to a second database and stored in obfuscated form on that second database. The third party can then be granted access to the obfuscated data in the second database and this prevents the third party from having any ability to access to the original sensitive data. Such a system, however, is not suitable for implementation in a cloud computing environment, because the system provides a very static solution and cannot respond to the dynamic transportation of data across multiple servers or the setting up of processing capability on demand.

The embodiments described below are not limited to implementations which solve any or all of the disadvantages of known methods of providing data security.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus for providing data security, in particular for cloud computing environments, are described. In an embodiment, a software component monitors events at a node in a computing system and on detection of an event of a particular type, interrupts a message associated with the event. Before the message is allowed to continue towards its intended destination, a security template is selected based on the message (e.g. the data in the message and identifiers within the message) and this template is used to determine what data protection methods are applied to each data element in the message. A modified data packet is created by applying the security template and then this modified data packet is inserted into the message in place of the data packet in the interrupted message.

A first aspect provides a method of securing sensitive data in a computing system, the method comprising: monitoring events at a node in the system; on detection of an event of a specified type, interrupting a message associated with the event; selecting a security template from a set of security templates based on data in the message and at least one parameter associated with the message; applying an obfuscation method to at least one data element within the data in the message according to the selected security template to create modified data; inserting the modified data into the interrupted message in place of the data in the message; and releasing the message.

The obfuscation method may comprise one of a method to create obfuscated data from input data and a method to recover original data from obfuscated input data.

Applying an obfuscation method to at least one data element within the data in the message according to the selected security template to create modified data may comprise: applying a plurality of Obfuscation methods to create the modified data, each obfuscation method being applied to a different data element within the data in the message according to the selected security template.

The modified data may comprise a data element which is unchanged from the data in the interrupted message.

The at least one parameter associated with the message may comprise a user or session identifier and a transaction type.

The method may further comprise initiating the method in response to a trigger message.

The system may comprise a cloud computing system.

The node in the system may comprise an execution node of a gateway server at a perimeter of the cloud computing system. The specified event type may comprise service invocation calls.

The node in the system may comprise a load balancing server within the cloud computing system. The specified event type may comprise service transactions diverted to an untrusted server. The untrusted server may be defined based on a geographical location of the server.

The node in the system may comprise a device acting as a client of the cloud computing system. The specified event type may comprise HTTPs or Mobile Gateway delegated calls.

The node in the system may comprise a boundary between architectural layers in the system.

The boundary may comprise a boundary between a data storage layer and a business logic layer and the specified event type may comprise stored procedure execution on data stored in the data storage layer.

The boundary may comprise a boundary between a business logic layer and a user interface layer and the specified event type may comprise web service execution calls and wherein the at least one parameter associated with the message comprises a user identifier.

The event of a specified type may comprise file transfer activity.

A second aspect provides a computer program which, when executed on a computing system, performs all the steps of any of the methods described above. The computer program may be stored on a tangible computer readable medium.

A third aspect provides a computer system comprising: a processor; and a memory arranged to store computer executable instructions which when executed cause the processor to: monitor events at a node in the system to detect events of a specified type; interrupt a message associated with a detected event of a specified type; select a security template from a set of security templates based on data in the message and at least one parameter associated with the message; apply an obfuscation method to at least one data element within the data in the message according to the selected security template to create modified data; insert the modified data into the interrupted message in place of the data in the message; and release the message.

A fourth aspect provides a method substantially as described with reference to any of FIGS. 2 and 3 of the drawings.

A fifth aspect provides a system substantially as described with reference to any of FIGS. 1 and 4-7 of the drawings.

The methods described herein may be performed by software in machine readable form on a tangible storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
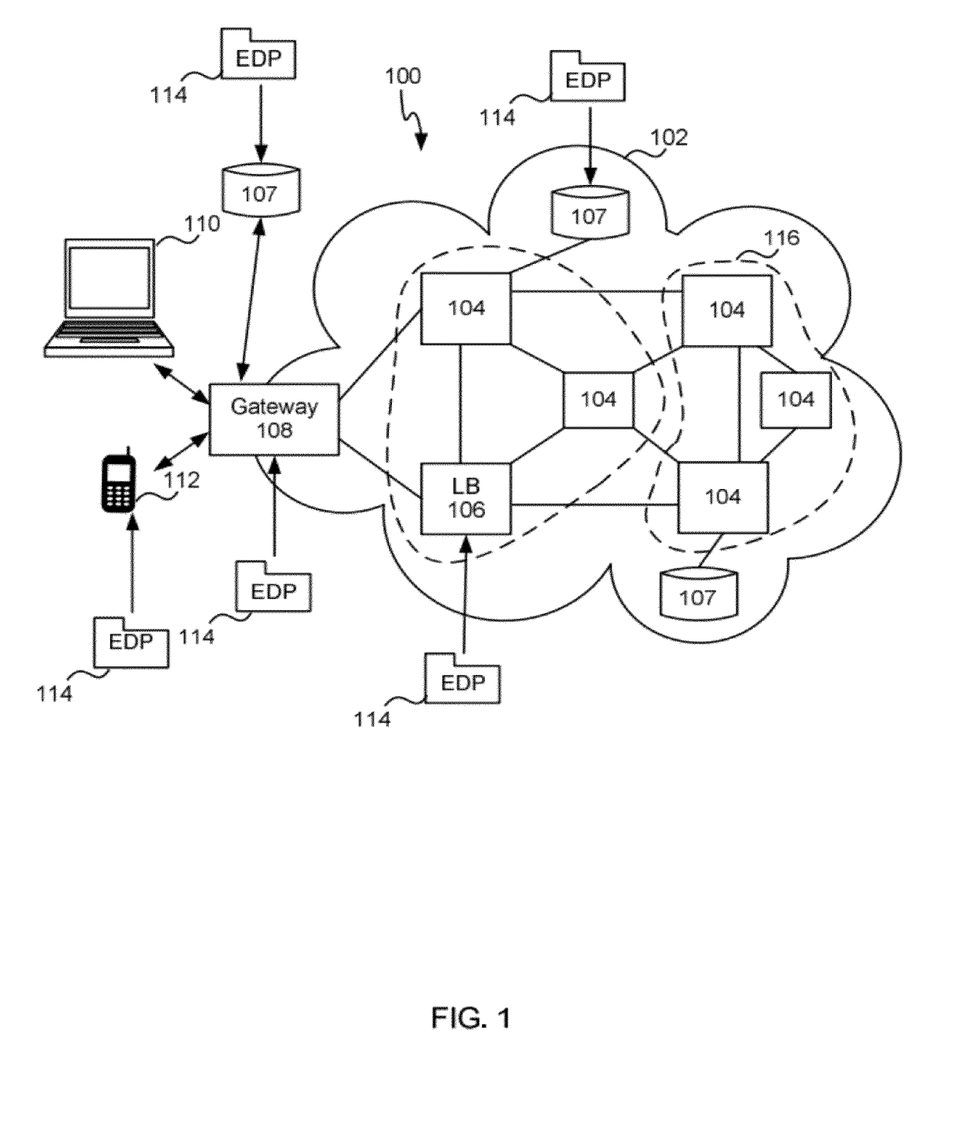
FIG. 1 shows a schematic diagram of a system comprising a cloud computing system.

FIG. 1 shows a schematic diagram of a system 100 comprising a cloud computing system 102. The cloud computing system 102 comprises a plurality of interconnected servers 104, 106 and data stores 107 (which may comprise database servers) and one or more gateway servers 108 located at the perimeter of the cloud. The cloud computing system 102 offers services to users outside of the cloud and these services may be web services or may include provision of software, platforms, infrastructure and/or storage as services. The gateway server 108 (which may, for example, be a web services or internet protocol gateway server) is adapted to receive inbound service requests from clients outside of the cloud, such as a web browser running on computer 110 or a smart phone application running on mobile device 112 and to send corresponding outbound service requests to services run on servers 104, 106 in the cloud. Service responses are received by the gateway 108 from servers in the cloud and are sent on to the appropriate client. The gateway server may also perform other functions, such as protocol conversion (e.g. where different protocols are used to provide a service within and external to the cloud).

A service request received by the gateway server 108 may be sent to one of many servers 104 where data contained within the request may be processed or stored (e.g. in a data store 107) and the servers 104 (and data stores 107) used may be dynamically provisioned, for example, based on the toad on each server. Where such dynamic provisioning occurs, this may be controlled by a load balancing server 106 within the cloud computing system 102. In some situations, confidential or other sensitive data is included within a service request sent by a client (e.g. running on device 110, 112) into the cloud 102 and the uncertainty regarding the location of data processing/storage within a cloud computing system can cause significant security problems for the owner of the data. This is exacerbated where the cloud computing system extends across multiple geographical locations (e.g. multiple countries), for example because different countries have different data protection requirements (e.g. as a result of different legislation). One solution to this concern regarding the security of data within a cloud computing system is for an enterprise to set up a private cloud computing system where the locations of all the servers are known, and these servers are 'ring-fenced' for their own use or for a particular customer's use, this cloud computing system is then controlled and effectively within the enterprise's firewall; however, this has the effect that the benefits associated with cloud computing systems are significantly reduced, as cloud computing costs are low due to shared service (and costs) across multiple clients, and the use of server firms in geographies where hardware and support staff are more economically serviced, e.g. Asia and Eastern Europe.

Data security can be provided in the system 100 shown in FIG. 1 using a software component 114 which may be located in one or more places within the system 100 and the operation of the component 114 can be described with reference to FIG. 2. This software component 114 may also be referred to as 'EDP' for 'Ensuring Data Privacy'.

Figure 2:
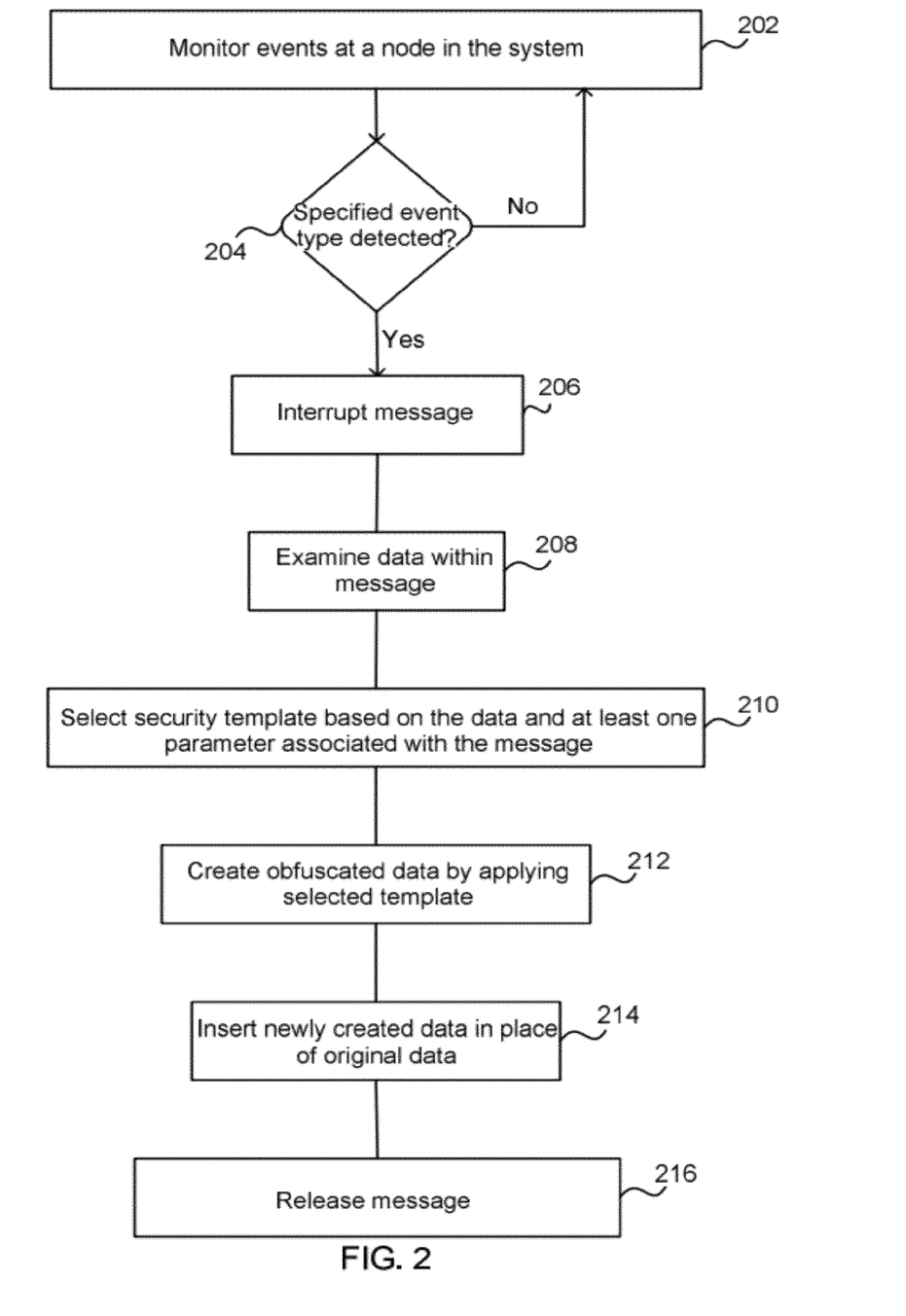
FIGS. 2 and 3 are flow diagrams of example methods of securing private or otherwise sensitive data.

FIG. 2 is a flow diagram of an example method of securing private or otherwise sensitive data, for example in a cloud computing environment such as shown in FIG. 1. In a first embodiment, the software component 114 may be located at the execution node of the gateway server 108 (which may be a web services gateway server). The software component 114 listens for specified events, such as web service invocation calls, which are received at the execution node (block 202) and on detection of a particular event or event type ('Yes' in block 204), the software interrupts a message associated with the event (block 206) and introspects the data within the message (block 208). A security template is then selected from a set of security templates based on the data itself and on one or more parameters associated with the message (block 210) and obfuscated data is created by applying the selected template (block 212). The security templates and obfuscation process are described in more detail below. The newly created data (from block 212) is then inserted into the interrupted message in place of the original data (block 214) before the message is released (block 216, e.g. is allowed to continue towards its intended destination).

The message associated with the event (as interrupted in block 206) is the procedure which is marshalling data for the detected event and in an example, the event detected is 'Execute WebServiceX' and it is this WebServiceX which is interrupted and its data obfuscated before it is allowed to complete.

The original data (which is replaced in block 214) may be deleted or may be stored by the software component 114 (e.g. for audit purposes, which may be particularly useful for industries in high compliance environments, such as the pharmaceutical industry).

The term 'listen' with reference to specified events (in block 202) encompasses any method of monitoring and determining what events are occurring. In an example, the software component may monitor events by polling event queues or take other active steps to identify current events (e.g. it may register itself to receive events if that function exists, for example in Java eventing or Microsoft WMI). The term 'introspect' or 'introspection' is used herein to refer to a process of examining the contents of an item, such as a message or event call.

Through use of the software component 114 and method as described above, data security is provided within the cloud 102 at runtime and changes are not typically required to the client or to the applications running on the devices 110, 112 outside the cloud or to the services provided by the cloud 102 (it will be appreciated that although changes may not be required, in some instances, there may be changes made to the applications running on the devices). In the embodiment described above, sensitive data, which may, for example, be personal data input by a user to an application (e.g. a web browser) running on a computing device 110, 112, is automatically secured on entry to the cloud.

There are many example applications for the software component and method, for example, where the service provided is software as a service, a user (which may be an individual or an enterprise) can ensure data privacy without requiring the software vendor to modify the code of the software application which is being "rented" by the user. In another example application, data storage may be being provided by the cloud as a service (e.g. an email server, document server or operational database) and by intercepting the data when it is sent for storage (and reconstructing it when it is accessed from the data store, as described below with reference to FIG. 3), data privacy can be ensured irrespective of any data privacy systems implemented by the cloud or data storage providers.

In a second embodiment, the software component 114 may be located on the load balancing server 106 within the cloud 102. In such an embodiment, the method monitors service transactions (which may relate to web services or the provision of software, platforms, infrastructure or storage as a service) to identify those which are diverted to an 'untrusted' server (in block 202). The 'untrusted' servers may, for example, be servers which are located in a different geographical location (e.g. as indicated by the dotted line 116) or who are operated by a different (or unknown) party etc. Those servers which are considered untrusted may be specified directly within the software component, or within a library accessed by the software component, (e.g. by IP address or other identifier) or parameters may be defined which characterise servers which are considered trusted/untrusted. In an example, server aliases or IP addresses are captured in a configuration table with their 'location' and this table is then used to evaluate the event 'catch' to see whether the load balancer is pushing data to an untrusted or a trusted server. The configuration table may be part of the software component 114. This specification of details by which untrusted servers can be identified may, for example, be performed by a user or by a system administrator. As described above, if an appropriate transaction is identified ('Yes' in block 204), the associated message is interrupted (block 206) and the data in the message is replaced by data which is obfuscated based on a security template (blocks 208-214) before the message is released (in block 216).

In a third embodiment, the software component 114 may be located on the device 112 outside the cloud and this may be particularly applicable where the security of the link between the device 112 and the gateway server 108 may not be guaranteed to a sufficiently high level for a particular application. In the example shown in FIG. 1, the device 112 is a mobile device (e.g. a smart phone, PDA or tablet computer and the software component 114 may be used to secure sensitive data before it is sent over the mobile network. In such an embodiment, the method listens for HTTPs, or Mobile Gateway delegated calls and if an appropriate event is identified ('Yes' in block 204), the associated message is interrupted (block 206), the data in the message is replaced by data which is obfuscated based on a selected security template (blocks 208-214) and then the message is released (block 216).

In a fourth embodiment, the software component 114 may be located on a database server 107 within the cloud in order to interrupt events such as stored procedures, direct access calls and data extract calls (in block 206). Where such an event is detected (in block 204) and the associated message interrupted (in block 206), the software component replaces data in the message by data which is obfuscated based on a selected security template before releasing the message. Through locating the software component 114 on a database server in the cloud, data can be provided to third parties by the server in a format which is appropriate to the particular third party accessing the data and which maintains data security. Similarly, if the data is stored on the database server in obfuscated form, the software component may be used to provide clear text data to some clients with appropriate permissions (as described below with reference to FIG. 3).

The types of events which are monitored (in block 202) and detected (in block 204) will depend on the location of the software component 114 within the system 100. In many of the examples described herein, the specified event types are 'Invoke' events and examples of such events include: execute web service, execute stored procedure, execute file move/copy/extract. In other examples, the software component may look for certain standard application and server events (in block 202), e.g. WMI (Windows Management instrumentation) for operating system/application actions, e.g. user request to 'run report'.

Although the examples are described above relating to interrupting event calls (i.e. messages associated with events) which are directed into the cloud, the method described may be applied to event calls originating in the cloud and having a destination outside of the cloud, such as for service responses.

As described above, the data obfuscation is performed (in block 212) based on a security template which is selected from a set of different security templates (in block 210). Each security template identifies both the location of data elements within the data packet to which it will be applied and the obfuscation technique (if any) which should be applied to each data element. This may be described as tagging data elements to be obfuscated or anonymised) with the required obfuscation type.

In a simple example, where the data comprises elements 1-6, the location of the data elements may be specified as line 1=element 1, line 2=element 2 etc, and the obfuscation techniques to be applied may be specified as element 1=surrogation, element 2=encryption, element 3=non-reversible encryption, element 4=no obfuscation, etc. As shown by this example, different data elements in the data packet may have different obfuscation techniques applied to them in order to create an obfuscated data packet and some elements may not be obfuscated so that they remain in clear text within the obfuscated data packet. In an example, the obfuscation techniques may be selected from a set comprising: encryption (e.g. using an industry standard algorithm such as AES128 or 3-DES) and a customised protocol (which may be configured by the client, e.g. data replacement with special characters—'$' for 's') and in each case, the technique may be specified as being reversible or non-reversible (i.e. even using the software the data obfuscation cannot be reversed). Where a reversible obfuscation technique is used, a 'hook' is placed within the obfuscated data which provides data to enable another instance of the software component 114 (or other software) to reverse the obfuscation (e.g. this data may describe how to use a key, which is provided separately to the other software component, in reversing the obfuscation). Where encryption is used and is specified as non-reversible, the key used for encryption may be destroyed after the encryption has been performed to ensure that the encryption cannot be reversed.

A security template may be applied to a single data element or may be applied in an iterative process to each element within a batch of data and in some examples, templates may be configured to be of type 'singleton' (i.e. for application to a single data element) or 'iterative' (i.e. for application to a batch of data'). In an example, the interrupted message may comprise data being returned in response to a 'Get my data' request and in which case, there may be only one data set to which a template is applied however, the message is a response to a request to 'Get all patient results for Bristol', the message will contain multiple data sets (each of which may comprise multiple data elements) and a security template may be applied to each data set in turn.

The use of a security template as described above enables a multi-strategy solution to data obfuscation within a single data set (or data packet). The use of a security template which is selected from a set of different templates enables the software component to perform batch operations on different forms of data packet and to provide different levels of data Obfuscation dependent upon the requirements of a particular application. This makes the method very flexible and configurable for the user. In addition, the use of a security template provides a targeted system which only obfuscates the data elements that are required to be obfuscated (rather than obfuscating everything "just in case") and enables the resultant data packet to still be processed by other applications/software solutions for the pieces that are not obfuscated without the need to reverse any obfuscation. This provides efficiency savings and enables the system to handle the complexity of large volumes of variable data which is being transmitted around within a cloud computing system.

The security template may be selected (in block 210) based on characteristics of the data packet itself and also on one or more other parameters identified from the interrupted message such as:
the User ID
the Session ID (i.e. the session type, Authorised User/Reviewer/Guest etc)
the Server Location (which may be parameterised for logical/physical addressing of the servers in the cloud, e.g. SERV001 is in country X, therefore data is obfuscated)
the Device/Communication channel type (e.g. browser, mobile gateway, mobileweb etc)
the Device ID
the Transaction Type
data within the Transaction (e.g. a 'Query' is obfuscated but an Update Event is not and can therefore pass straight through)
time (e.g. obfuscation is implemented out of normal working hours for the location as at this time, it is likely data may be routed to servers in other countries)

In a particular example, a 'Guest User' user calls to execute a web service in the cloud under their session for the 'Reporting' application session, the application executes a report and accesses the database server for a 'query' of the dataset. This query event is trapped by the software component which establishes that a 'Guest User' cannot see raw data and applies the data anonymisation template for the query requested (logical dataset name that derives the template to use).

In some examples, the parameter (or multiple parameters) associated with the message is used to establish the execution context and the data is used to establish the obfuscation actions for this context.

Figure 3:
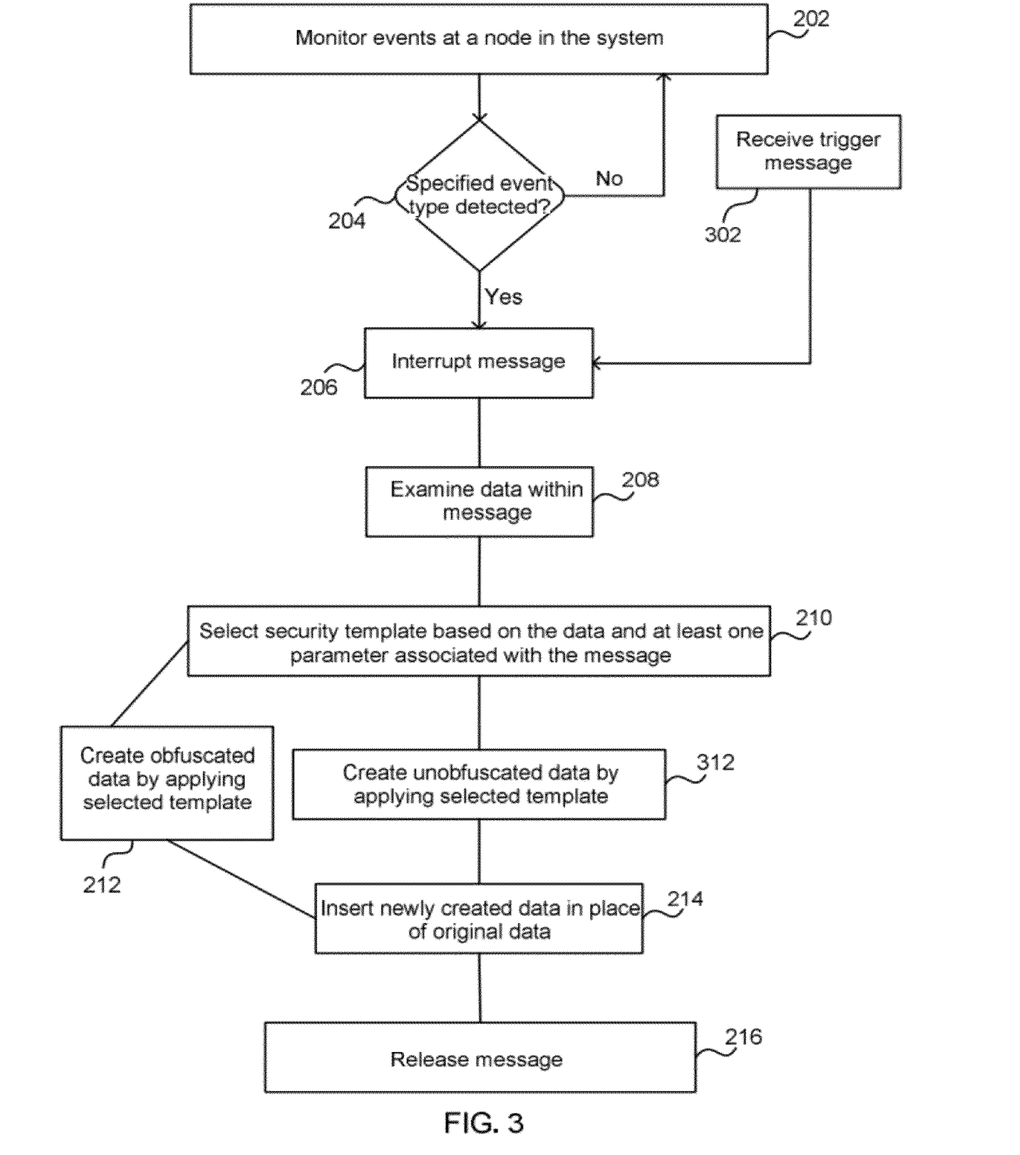

In the examples described above, the software component 114 is used to obfuscate data; however, as shown in FIG. 3, the software component may also be used to reconstruct the original data from data received in an obfuscated form (in block 312) and this may be implemented by the software component 114 in any of the embodiments described above. As before, the software component 114 listens for a particular event type at a node in the system (block 202), where this node may, for example, be the execution node at the gateway server 108, a load balancing server 106 or a client device 110, 112. On detection of an event of the type defined ('Yes' block 204), a message associated with the event is interrupted (block 206) and the data, which in this instance is obfuscated data, is examined (in block 208). A security template is then selected based on the data and at least one parameter associated with the message (in block 210). By applying the selected template (in block 312), a clear text version of the obfuscated data is created and this data is then inserted into the message (in block 214) before the message is released (in block 216). The security templates used (e.g. as selected in block 312) may be the same templates as are used to obfuscate data (e.g. in block 212 of FIG. 2) and where a data element is defined in the template as being obfuscated in a non-reversible way, this data element may be skipped (in block 312).

In an embodiment where the software component 114 is located on a device 110, 112 outside the cloud 102 and where the security of the link between the device and the gateway server 108 is unknown or not satisfactory, obfuscated data may be transmitted over this link and then the software component 114 may reconstruct the clear text data (in block 312) so that it can be presented to a user (e.g. in a web browser window or other application window). The obfuscated data which is sent over the link from the gateway server 108 to the device 110, 112 may have originated within the cloud 102 or, in some examples, may be created (e.g. using the method shown in FIG. 2) by an instance of the software component 114 running at the gateway server 108.

In another embodiment, there may be local storage inside and outside the cloud (e.g. data stores 107 and 117) and applications running on both sides of the divide. Instances of the software component 114 may be located both inside and outside of the cloud 102 to execute for this storage such that the data in the two data stores 107, 117 can be kept synchronised, whilst the data in the store 107 within the cloud is stored in obfuscated form. This arrangement allows data to be processed locally (e.g. outside the cloud, using data from data store 117) at times of low load and data to be processed elsewhere (e.g. within the cloud, using the same data but as stored in data store 107) at times of peak processing load.

In a further embodiment where there are multiple instances of the software component running concurrently, a satellite phone link may be used to upload data from a client device 110, 112 outside of the cloud for storage in a central database (e.g. data store 107). In this embodiment, the data may be obfuscated by the software component 114 running on the client device before it is transmitted over the satellite link and then the data may be de-obfuscated at the central database.

Although the methods shown in FIGS. 2 and 3 show a template being used to either obfuscate data or recreate the original data, in another variation of the method, a security template may be applied which (in a method step which is a combination of blocks 212 and 312) obfuscates some elements of the data in the interrupted message and for other elements replaces obfuscated data with clear text. In another variation, a template may, in addition or instead, apply further obfuscation methods to already obfuscated data (e.g. by encrypting a data element which has previously been surrogated) for one or more data elements in the interrupted message according to the selected security template.

FIGS. 2 and 3 show the interactions of the software component in 'active mode' where the software component interacts and effectively interrupts execution of software services to perform the required obfuscation. In an example implementation, the software component comprises an Event Listener module that is configured to poll for events in the operating system in which it is deployed. The Event Listener polls the event queue resident in the operating system, and receives events that have been posted (in block 202). Each event is introspected for its data content, and compared to a mapping table within the software component to validate whether this event requires an action by the software component, or not (block 204). If there is no mapping, the event is ignored. If there is a mapping, the software component calls the configured service on the operating system to interrupt the action (i.e. the associated message) within the operating system (in block 206), and access the datasets within that service (in block 208). For example, if an executing web service has posted XML Request and Response messages which are resident in the operating system memory at the point of execution in web server, once the Event Listener has identified that a web service execution request is mapped to an obfuscation action in its mapping table, the software component accesses these in memory XML request and response messages, and actions the security template configured for this service/the parameters defined in the template to perform the configured obfuscation. Once complete the service is free to execute as intended (it is released in block 218), but without knowledge of the obfuscation that has been performed.

In the examples described above, the interruption of a message (in block 206) is triggered by the detection of an event which meets predefined criteria (in block 204). In a further variation of the method, the interception may, in addition or instead, be triggered by a specific triggering message (received in block 302). Such a mode of operation of the software component 114 may be considered a passive mode (as it waiting for a trigger rather than actively listening for event calls), compared to an active mode as described previously. The trigger message (received in block 302) may be sent by an application (e.g. running on a client device 110, 112), by a server 104 in the cloud 102, or by another entity.

Although the software component 114 and the methods of FIGS. 2 and 3 have been described above with reference to use in a cloud computing environment, such as shown in FIG. 1, the software component 114 and methods may be used in many different systems (including other distributed computing systems such as grid computing and peer-to-peer networks) and at many different nodes within such systems and further examples can be described with reference to FIGS. 4 and 5.

Figure 4:
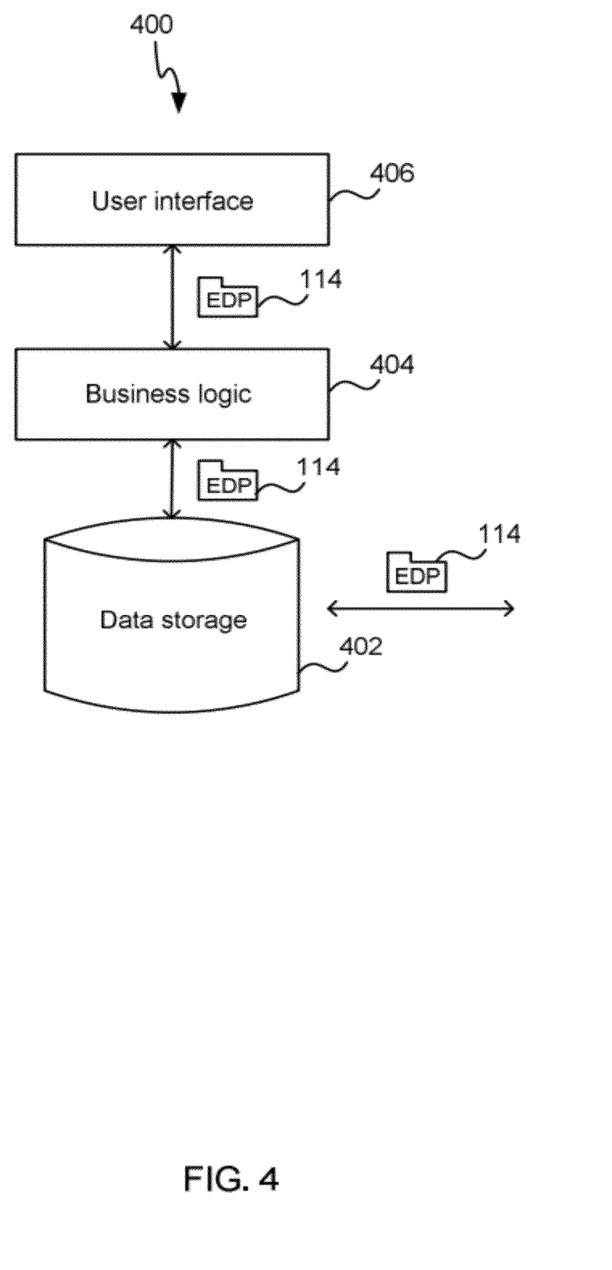
FIGS. 4-6 are schematic diagrams of further systems in which the methods of FIGS. 2 and 3 may be implemented.

FIG. 4 shows a schematic diagram of a system 400 in which the software component 114 described above may listen at the boundary between architectural layers 402, 404, 406 and perform a method as described above with reference to FIGS. 2 and 3. Although FIG. 4 shows the component 114 in three different positions, a system may comprise one or more instances of the software component and examples of the operation of the component in each different location are described below. The system 400 may, for example, be any server and this server may, for example, be one of the servers 104 in the cloud computing environment 102 shown in FIG. 1.

The software component 114 in this circumstance is listening for communications events) between the architectural layers of a different software component, examples of this would include web service communications between a website server page and the business logic layer at 406 and 404, or IP-based communication between business logic and the data layer at 404 and 402. There are various communication types that could be listened for, including web services, HTTP Post/Get, IP communications, Java RMI and SOAP.

In a first example, the software component 114 may listen at the boundary between data storage 402 and business logic 404 for stored procedure execution on the database, e.g. messages providing data from the data storage 402 to the business logic 404 and calls from the business logic 404 which write data to the data storage 402. When an event providing data to the business logic 404 is detected ('Yes' in block 204), a message associated with the event is interrupted (in block 206) and the data packet within the message is examined (in block 208) and used in selection of an appropriate security template (in block 210). In such an example, the parameters used in the selection of a template may include the particular business logic which is requesting the data. This is because business logic is typically data dependent and therefore use of an appropriately selected template enables the data provided to be in the correct format, e.g. the business logic may process age information and expect the personal age data to be in the form DD/MM/YYYY. Where the data stored in the data storage 402 is stored in obfuscated form, the template may be used (in block 212 or 312) to recreate the original data (e.g. to recreate a person's actual date of birth, 14/12/1971) or to create an obfuscated form of the data which is in the format required so that the business logic can function (e.g. by setting the day and month to one and having only the year field in clear text, 01/01/1971). Where the data stored in the data storage 402 is not obfuscated, the template may be used (in block 212) to create an obfuscated version of the data packet which still enables the business logic to perform the required operation (e.g. by converting an actual date of birth 14/12/1971 to 01/01/1971).

The software component and method described in this example enables anonymisation to be retrofitted to a system architecture which includes a business logic layer which is data dependent. Typically, without such a solution, the data dependency of the business logic layer prevents retrofitting of anonymisation (e.g. anonymisation which converted a date of birth of 07/01/1966 into an age 44 would result in the failure of the business logic).

In a second example, the software component 114 may listen at the boundary between the business logic 404 and the user interface 406 and in an example the component may listen for web service execution I/Os. By selecting a security template (in block 210) based on the user ID (e.g. which may be included within a token in the I/O, where the token is associated with the security model of the I/O) the information that is provided to the user interface (and hence displayed to the user) can be tailored. For example, the data stored in the data storage 402 may be patient records and this information may be accessed via the user interface 404 by healthcare professionals (e.g. doctors, nurses etc) and by pharmaceutical companies. Through selection of a first security template by the software component (in block 210), the healthcare professionals may be able to view all the sensitive patient data and through selection of a second security template, the pharmaceutical company may be able to view anonymised patient data (e.g. with patient details, such as name, date of birth, address and patient ID obfuscated). In another example, a request that is received from a user who is internal to an organisation may receive clear text data and a request that is received from a user who is external to the organisation may receive data which is, at least in part, obfuscated. This enables multiple stakeholders to access the same data using the same application whilst customising the data they receive to ensure data security.

In a third example, the software component 114 may listen at the boundary between the data storage 402 and another application which reads/writes data without going via the business logic 404, such as a database reporting tool. In this instance, the software component 114 may listen for extract/import procedures (in block 202) and then either obfuscate data (in block 212) or generate clear text data (in block 3(2) as appropriate based on whether the data stored in the data storage 402 is in clear text or obfuscated form and based on the data and at least one parameter associated with the intercepted message (as in block 210).

Figure 5:
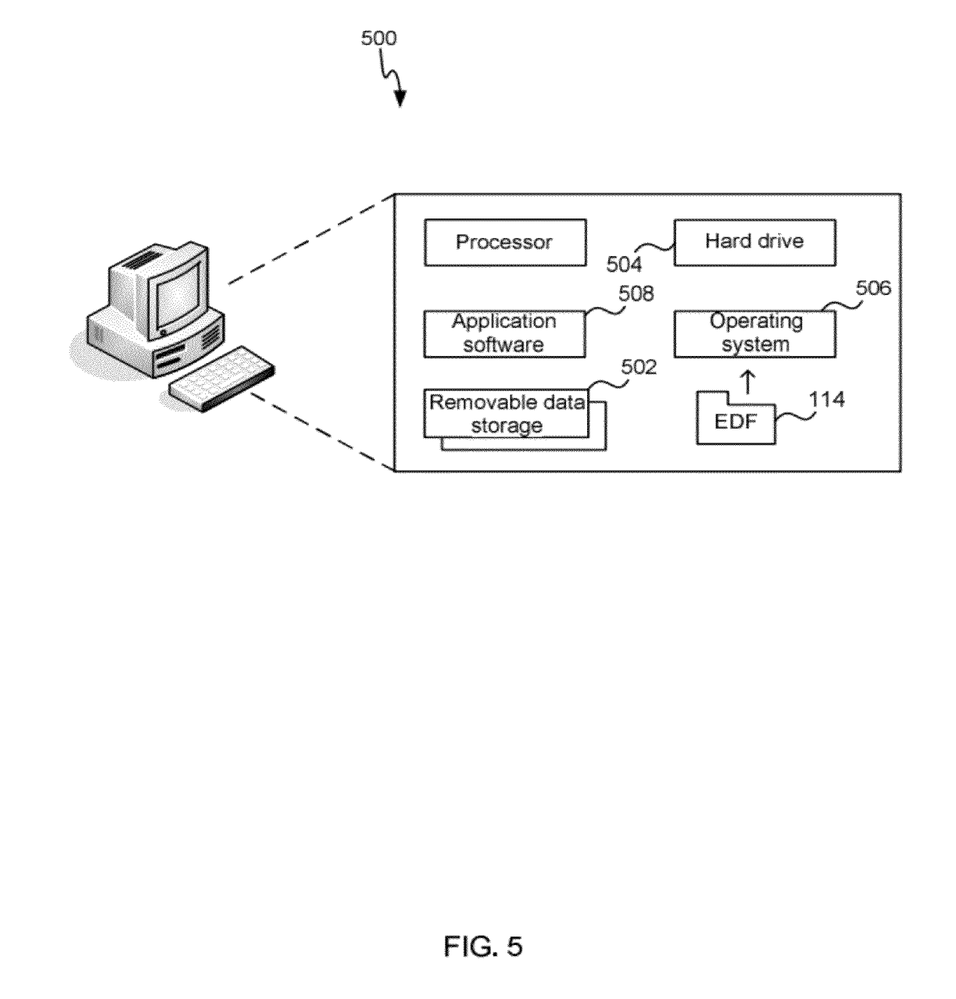

FIG. 5 shows a schematic diagram of a system 500 which comprises a computing device which may be connected to a network or a stand-alone device and which may, for example, be a desktop or laptop computer or a mobile device such as a smart phone or audio player (e.g. MP3 player). In this embodiment, the software component 114 listens for file transfer activity (in block 202) which may include exporting data to a removable data storage element 502 (e.g. a disk or memory stick) and/or moving data from a network data store (not shown in FIG. 5) to a local data store (e.g. hard drive 504). Where such file transfer activity is detected, the file move is interrupted, the data is obfuscated as described above with reference to FIG. 2 and the obfuscated data is stored in the new location. Use of such a software component 114 enhances the security of the system by ensuring that sensitive data is not stored on a removable data storage element 502 in clear text form (which presents a security risk if lost) and does not require any changes to the operating system 506 or application software 508 running on the computer.

Having transferred data to a removable data storage element or network data store, as described above, it many be necessary to obtain the original data for subsequent processing. In order to reverse the obfuscation, a machine may run the software component to perform the method shown in FIG. 3 and described above when obfuscated data is transferred from a removable storage element or network data store to the hard drive of the machine. In another example, the software component may be called directly (in passive mode, as described above) to reverse the obfuscation when required (e.g. this call may be included within the processing application).

In a variation of the systems described above the software component 114 may be used to protect data against interception and unauthorised distribution. This data may, for example, be audio data (e.g. MP3 tracks) being sent from one media company to another over a direct (back to back) connection. The audio data (or the metadata associated with an audio file) may be transmitted in an obfuscated form (e.g. as generated using an instance of the software component on the transmitting machine) and the obfuscation may be reversed on receipt of the data by an instance of the software component on the receiving machine. On playback, the method shown in FIG. 3 may be used to reconstitute the original data in real time and as part of selection of the security template (in block 210) the authorisation of the receiving entity to play the particular track may be checked. Where the authorisation step fails, a security template may be selected which just passes through the Obfuscated data (which then will not play) or an exception may be raised. Consequently, anyone intercepting the transmission does not obtain data which can be played back. Similar techniques may be used to control access to audio data which is downloaded from an online store (in obfuscated form) by an end user. In such an example, the software component may be integrated within the playback application or may be a separate component. Use of such methods has the effect that if a user copies or otherwise shares the stored MP3 data in an unauthorised manner, the data is obfuscated and cannot be played back.

The software component and methods described above may also be used in providing increased data security by blocking sharing of certain data types (e.g. IP protected data, such as songs protected by copyright) by peer-to-peer mechanisms. In an example, an internet service provider (ISP) may host the software component on their web servers such that it listens for peer-to-peer traffic which is uploading (or downloading) data from one peer to other peers (in block 202). On detection of such events, the uploaded (or downloaded) data may be Obfuscated (and hence corrupted) by the application of a security template (in block 212) which may, for example, corrupt the header or binary mix the data. The data is consequently of no use to recipient and where network coding is employed within a peer-to-peer system may also have the effect of poisoning the all data being, shared within a peer-to-peer cloud such that it is rendered useless.

Although the software component is described as not requiring changes to applications, it will be appreciated that in some examples, the applications may be changed, e.g. to include calls to trigger the software component to run (e.g. in passive mode, as described above).

It will be appreciated that the methods described herein are agnostic to the type and form of data which is being obfuscated/de-obfuscated. Any reference to sensitive or personal data is by way of example only and the methods may be applied to any data.

Figure 6:
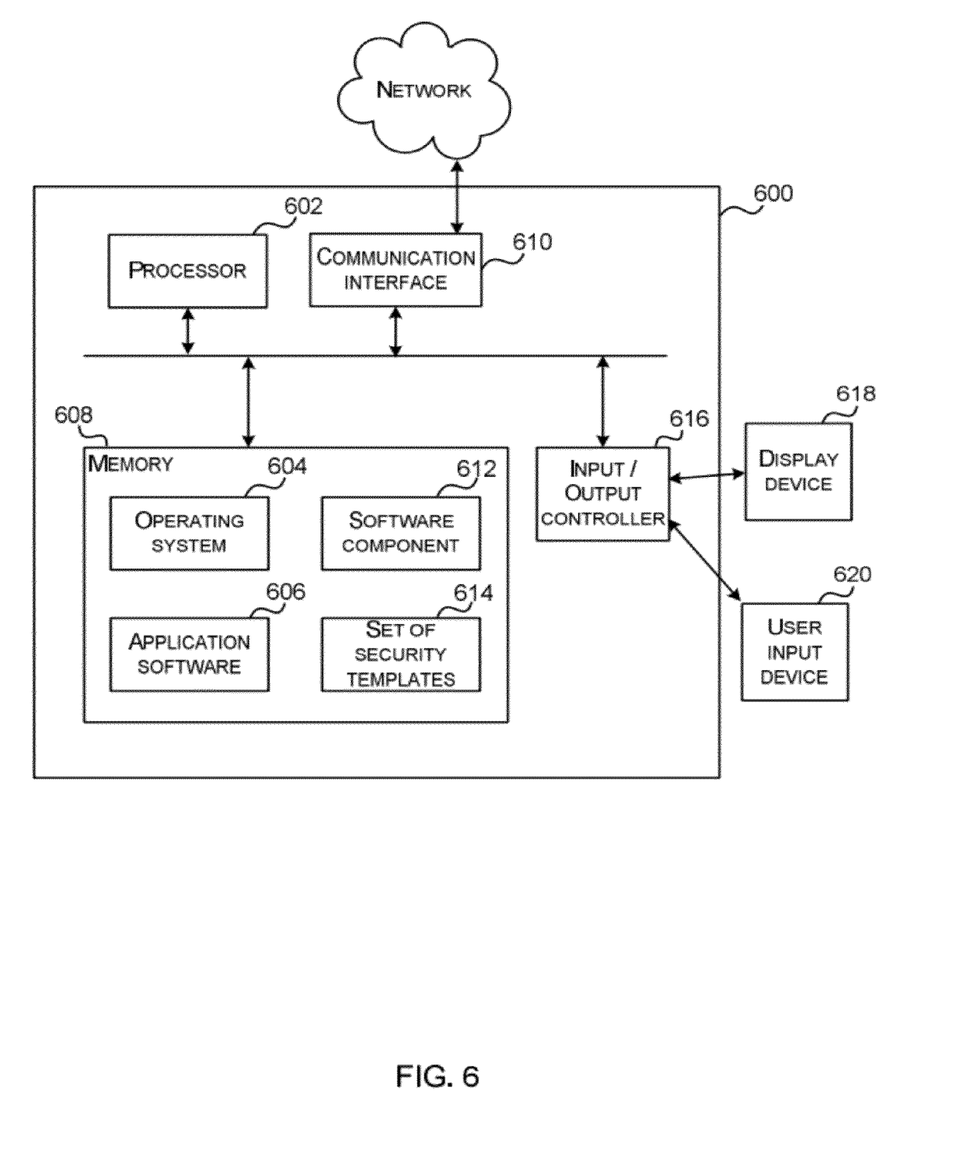

FIG. 6 illustrates various components of an exemplary computing-based device 600 which may be implemented as any form of a computing and/or electronic device, and on which the methods described above may be implemented. As described above, this computing-based device 600 may, for example, be a server, a mobile device etc.

Computing-based device 600 comprises one or more processors 602 which may be microprocessors, controllers or any other suitable type of processors for processing computing executable instructions to control the operation of the device in order to obfuscate (or un-obfuscate) data based on a selected security template. Platform software comprising an operating system 604 or any other suitable platform software may be provided at the computing-based device to enable application software 606 to be executed on the device.

The computer executable instructions may be provided using any computer-readable media, such as memory 608. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 600 it will be appreciated that the storage may be distributed or located remotely and accessed via a network or other communication link (e.g. using communication interface 610). The memory 608 may also be used to store the software component 612 and the set of security templates 614.

The computing-based device 600 may also comprise an input/output controller 616 arranged to output display information to a display device 618 which may be separate from or integral to the computing-based device 600. The display information may provide a graphical user interface. The input/output controller 616 may also be arranged to receive and process input from one or more devices, such as a user input device 620 (e.g. a mouse or a keyboard). This user input may be used to interact with the application software 606 and in some examples may be used to input the sensitive data to which the methods described above are applied. In an embodiment the display device 618 may also act as the user input device 620 if it is a touch sensitive display device. The input/output controller 616 may also output data to devices other than the display device, e.g. a locally connected printing device (not shown in FIG. 6).

Figure 7:
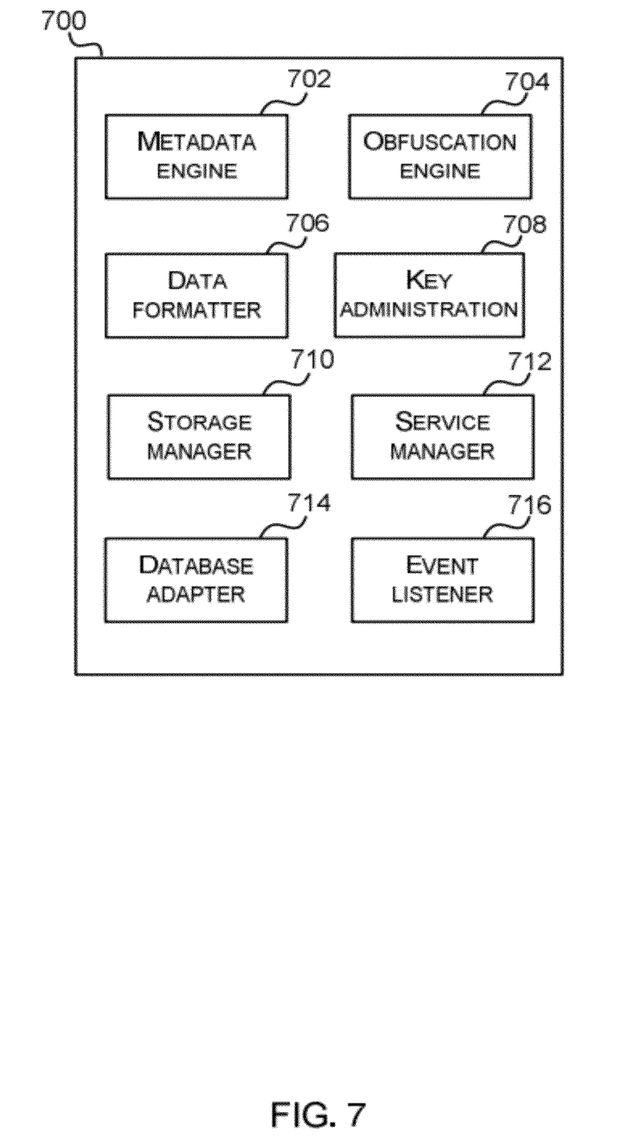
FIG. 7 is a schematic diagram of an example software component.

FIG. 7 is a schematic diagram of an example software component 700 which may be implemented using Java. The use of Java enables the component to run on many different platforms, including most smart phones. In this example, the component comprises a metadata engine 702 which manages the definitions of security templates, an obfuscation engine 704 which applies obfuscation techniques to data elements based on the selected security template, a data formatter 706, a key administration element 708, a storage manager 710 which handles the persistence requirements for the component, including storage of anonymised data, templates and obfuscation techniques, a service manager 712 which provisions the services to calling applications and batch jobs, a database adapter 714 which provides connectors to databases for external storage of datasets, rules, formats, templates etc and an event listener 716. The data formatter 706 performs transformations from source formats to ones to process internally and to output formats requires by the calling solution/service. This data formatter means that the component is agnostic to the industry, application and database used and XML may be used as the internal format. The key administration element 708 administers keys which are used in anonymisation. Where the anonymisation is reversible (as specified in a security template), the keys are stored by the key administration element; however, where the anonymisation is non-reversible (again as specified in the security template), the keys used for the non-reversible anonymisation are not stored but are deleted to prevent the reversing of the anonymisation by any party. The event listener 716 manages the execution of the software component in 'active' mode. It holds the configurations of events that will be monitored, how these events are 'grabbed' (i.e. how associated messages are interrupted) and how they are interpreted to select a particular security template. The event listener also calls external services, where required, to get and provide the required templates.

In an example, the software component is implemented using Service Oriented Architecture and in this case a service is compiled (on configuration of the system) which is then run automatically when a corresponding event is detected. By selection of a service to run, a security template is automatically selected (as a compiled service corresponds to a particular security template), applied and the obfuscated data is used to replace the original data in the event call.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic army, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples and embodiments described above may be combined with aspects of any of the other examples or embodiments described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of securing sensitive data in a cloud computing system, the method comprising:
   monitoring events at a node in the system; on detection of an event of a specified type, interrupting a message associated with the event;
   selecting a security template from a set of security templates based on data in the message and at least one parameter associated with the message, the at least one parameter being one of: a User ID, a Session ID, a Server Location, a channel type, a Device ID, a Transaction Type, or a time, the security template including a location of at least one data element within the data in the message and an obfuscation method to be applied to the at least one data element;
   applying the obfuscation method to the at least one data element within the data in the message according to the selected security template to create modified data;
   inserting the modified data into the interrupted message in place of the data in the message; and
   releasing the message.

2. A method according to claim 1, wherein the obfuscation method comprises one of a method to create obfuscated data from input data and a method to recover original data from obfuscated input data.

3. A method according to claim 1, wherein applying an obfuscation method to at least one data element within the data in the message according to the selected security template to create modified data comprises:
   applying a plurality of obfuscation methods to create the modified data, each obfuscation method being applied to a different data element within the data in the message according to the selected security template.

4. A method according to claim 1, wherein the modified data comprises a data element which is unchanged from the data in the interrupted message.

5. A method according to claim 1, further comprising initiating the method in response to a trigger message.

6. A method according to claim 1, wherein the node in the system comprises an execution node of a gateway server at a perimeter of the cloud computing system.

7. A method according to claim 6, wherein the specified event type comprises service invocation.

8. A method according to claim 1, wherein the node in the system comprises a load balancing server within the cloud computing system.

9. A method according to claim 8, wherein the specified event type comprises service transactions diverted to an untrusted server.

10. A method according to claim 9, wherein an untrusted server is defined based on geographical location of the server.

11. A method according to claim 1, wherein the node in the system comprises a device acting as a client of the cloud computing system.

12. A method according to claim 11, wherein the specified event type comprises HTTPs or Mobile Gateway delegated calls.

13. A method according to claim 1, wherein the node in the system comprises a boundary between architectural layers in the system.

14. A method according to claim 13, wherein the boundary comprises a boundary between a data storage layer and a business logic layer and wherein the specified event type comprises stored procedure execution on data stored in the data storage layer.

15. A method according to claim 13, wherein the boundary comprises a boundary between a business logic layer and a user interface layer and wherein the specified event type comprises web service execution calls and wherein the at least one parameter associated with the message comprises a user identifier.

16. A method according to claim 1, wherein the event of a specified type comprises file transfer activity.

17. One or more tangible non-transitory device-readable media with device-executable instructions that, when executed by a cloud computing system, direct the cloud computing system to perform steps comprising:
   monitoring events at a node in the cloud computing system; on detection of an event of a specified type, interrupting a message associated with the event;
   selecting a security template from a set of security templates based on data in the message and at least one parameter associated with the message, the at least one parameter being one of: a User ID, a Session ID, a Server Location, a channel type, a Device ID a Transaction Type, or a time, the security template including a location of at least one data element within the data in the message and an obfuscation method to be applied to the at least one data element;
   applying the obfuscation method to the at least one data element within the data in the message according to the selected security template to create modified data;
   inserting the modified data into the interrupted message in place of the data in the message; and
   releasing the message.

18. A cloud computer system comprising:
   a processor; and
   a memory arranged to store computer executable instructions which when executed cause the processor to:
   monitor events at a node in the cloud computer system to detect events of a specified type;
   interrupt a message associated with a detected event of a specified type;
   select a security template from a set of security templates based on data in the message and at least one parameter associated with the message, the at least one parameter being one of: a User ID, a Session ID, a Server Location, a channel type, a Device ID, a Transaction Type, or a time, the security template including a location of at least one data element within the data in the message and an obfuscation method to be applied to the at least one data element;
   apply the obfuscation method to the at least one data element within the data in the message according to the selected security template to create modified data;
   insert the modified data into the interrupted message in place of the data in the message; and
   release the message.

19. A cloud computer system comprising:
   a processor; and
   a memory arranged to store computer executable instructions which when executed cause the processor to:
   monitor events at a node in the system to detect events of a specified type; interrupt a message associated with a detected event of a specified type; select a security template from a set of security templates based on data in the message and at least one parameter associated with the message, the at least one parameter being one of: a User ID, a Session ID, a Server Location, a channel type, a Device ID, a Transaction Type, or a time, the security template including~a location of at least one data element within the data in the message and an obfuscation method to be applied to the at least one data element;

apply the obfuscation method to the at least one data element within the data in the message according to the selected security template to create modified data;

insert the modified data into the interrupted message in place of the data in the message; and release the message.

\* \* \* \* \*

UNITED STATES PATENT AND TRADEMARK OFFICE
CERTIFICATE OF CORRECTION

| | |
|---|---|
| PATENT NO. | : 8,769,613 B2 |
| APPLICATION NO. | : 12/948646 |
| DATED | : July 1, 2014 |
| INVENTOR(S) | : Stephen Latchem et al. |

It is certified that error appears in the above-identified patent and that said Letters Patent is hereby corrected as shown below:

In the Specification

Column 2, line 26: "Obfuscation" should be --obfuscation--;

Column 4, line 26: "toad" should be --load--;

Column 6, line 60: "instrumentation" should be --Instrumentation--;

Column 12, line 28: "Obfuscated" should be --obfuscated--;

Column 12, line 48: "Obfuscated" should be --obfuscated--;

Column 14, line 39: "army" should be --array--.

Signed and Sealed this
Twenty-ninth Day of September, 2015

Michelle K. Lee
*Director of the United States Patent and Trademark Office*